(12) United States Patent
Saito et al.

(10) Patent No.: US 7,604,471 B2
(45) Date of Patent: Oct. 20, 2009

(54) INJECTION MOLDING MACHINE

(75) Inventors: Osamu Saito, Yamanashi (JP); Yuusuke Imai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 297 days.

(21) Appl. No.: 11/890,476

(22) Filed: Aug. 7, 2007

(65) Prior Publication Data
US 2008/0038393 A1    Feb. 14, 2008

(30) Foreign Application Priority Data
Aug. 8, 2006   (JP)   .............................. 2006-216267

(51) Int. Cl.
B29C 45/77   (2006.01)
B29C 45/78   (2006.01)

(52) U.S. Cl. ........................ 425/144; 425/145; 425/149; 425/150

(58) Field of Classification Search .................. 425/143, 425/144, 145, 149, 150
See application file for complete search history.

(56) References Cited

U.S. PATENT DOCUMENTS 5,736,080 A * 4/1998 Suganuma .................. 425/145
6,761,552 B2 * 7/2004 Fujita ........................ 425/145
2006/0068050 A1    3/2006 Saito et al.

FOREIGN PATENT DOCUMENTS

| JP | 59-158237 | 9/1984 |
| JP | 60-196324 | 10/1985 |
| JP | 61-248722 | 11/1986 |
| JP | 2001-322150 | 11/2001 |
| JP | 2006-95760 | 4/2006 |

* cited by examiner

Primary Examiner—Tim Heitbrink
(74) Attorney, Agent, or Firm—Staas & Halsey LLP

(57) ABSTRACT

An injection molding machine configured so that items of molding conditions of which values are not changed can be set selectively when a set of molding conditions is read from a storage device so that values for the read molding condition items are set as the set values. Installation setting is established for the set items of those molding conditions of which set values are prohibited from being changed. When a set of predetermined values of the molding conditions is read from the storage device and set collectively, the set values for only those set items which are not designated to the installation setting are rewritten to the read values without changing the set values for the items designated to the installation setting. If a password with which the installation setting can be designated and canceled is entered, an installation setting mode is established, whereupon the installation setting for the set items can be designated or canceled. The set values for the items designated to the installation setting cannot be changed. If the set of molding conditions is read from the storage device and set collectively, therefore, the set values are fixed to the original ones without being changed. The set values for the items designated to the installation setting can be changed only if a special password is entered.

9 Claims, 6 Drawing Sheets

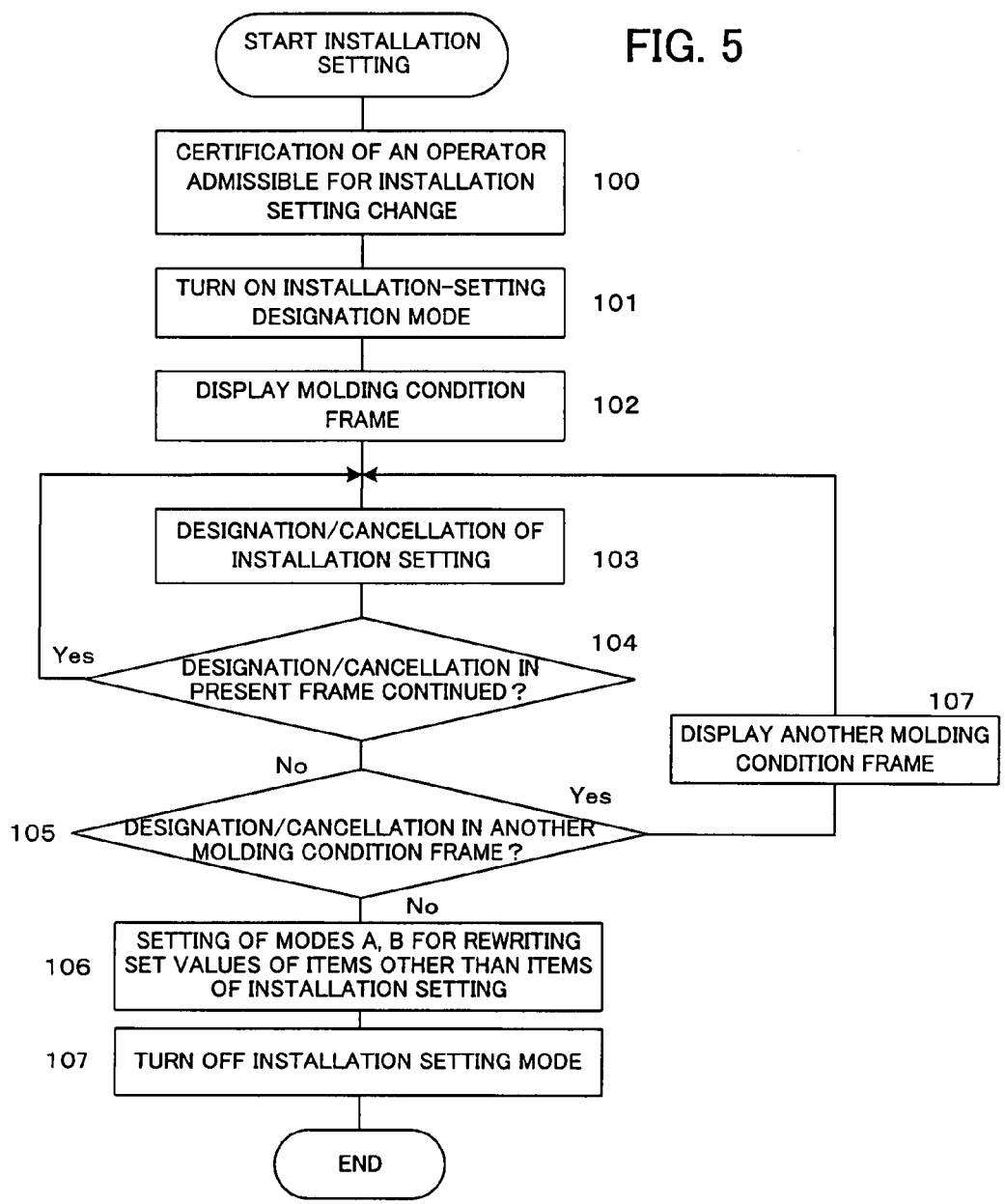

INJECTION MOLDING MACHINE

CROSS REFERENCE TO RELATED APPLICATIONS

This application is based on and claims priority to Japanese Application No. 2006-216267 filed Aug. 8, 2006, the disclosures of which are hereby incorporated herein by reference.

BACKGROUND OF THE INVENTION

1. Field of the Invention

The present invention relates to an injection molding machine, and more particularly to setting and change of molding conditions.

2. Description of Related Art

In molding products by means of an injection molding machine, various molding conditions must be set individually for processes of molding operation, including injection, filling, pressure holding, metering, mold opening, mold closing, and mold clamping. These molding conditions to be set are large in number. In order to obtain conforming molded products, moreover, condition setting operation is required such that test injection is repeated as molded products obtained by the test injection are observed and that molding conditions are changed. Since this condition setting operation is hard and time-consuming, some conventional systems have been tried as follows (see JP59-158237A, JP60-196324A and JP61-248722A). First, a set of values of all the molding conditions with which conforming molded products are obtained are stored in advance corresponding to a mold for use or the molded products in a storage device of the injection molding machine or a storage device or storage medium outside the machine. When this mold is then used to mold identical products, the set values of the molding conditions stored corresponding to the mold or the molded products are read from the storage device. The read set values of the molding conditions are automatically collectively set in the injection molding machine.

In general, the sets of molding conditions that are stored in the storage device or the external storage medium are stored according to the mold or the molded products. In some cases, sets of molding conditions of a plurality of types may be prepared for the same mold and stored in advance. Also in these cases, any of the sets of molding conditions corresponding to the mold is selected and set automatically. Thus, the molding conditions are generally changed and automatically set as the mold is replaced with a new one.

However, set items of molding conditions that are set in the injection molding machine include attended and unattended operation modes, heater disconnection detection values, confirmation of load cell pressure correction, etc., which are not associated with the mold replacement, that is, set items of molding conditions that should not be changed despite the change of the mold. Further, the set items include a machine state to be indicated by an alarm lamp, a timer based on a calendar function, etc., which are settled depending on other conditions regardless of the mold. Set values for these set items should not be changed even when they are set after the molding conditions are read from the storage device in association with the mold replacement. These set items of the injection molding machine include ones whose set values are changed when the molding conditions are read from the storage device and ones whose set items are not.

There is known an invention (see JP 2006-95760A) as an example of a system for clarifying this discrimination. According to this invention, molding conditions that depend on the mold and other molding conditions are stored separately. A mold ID is attached to the molding conditions based on the mold and previously stored corresponding to the mold. In replacing the mold with a new one, molding conditions that depend on the mold to be used are read and set collectively. In displaying the molding conditions, it is discriminated whether or not they are settled depending on the mold.

Also known is an invention (see JP 2001-322150A) in which molding conditions are previously set in an injection molding machine. In reading and changing molding conditions stored in an external or internal memory, all the molding conditions including temperature data in the memory are read and substituted for the previously set molding conditions. Alternatively, only those other data than the temperature data, out of the molding conditions stored in the external or internal memory, are read and substituted for the previously stored molding conditions.

When the molding conditions are read and set collectively, whether or not a set value for a set item of a certain molding condition changes in association with the molding condition reading operation generally depends on the design of the manufacturer of the injection molding machine. In some cases, however, the set values for the items having so far been set in the injection molding machine may be expected to be used without being changed even though they are designed to change when the molding conditions are read from the storage device. In order to fix the machine operation after a shutdown sequence or a monitor item for conformity determination, for example, the set values for the set items sometimes should not be changed when the molding conditions for the substituted mold are read and set.

If molding conditions that are set as master conditions for the confirmation of molding stability when molds are completed in a mold manufacturing department are transferred together with the molds to a mass-production plant, moreover, the administration of the plant sometimes may want to fix set items of some molding conditions without change. If the master conditions are directly set without modification, in this case, there arises a problem that the set values for the set items for all the molding conditions are changed into the master conditions.

Therefore, it is desirable that items of the molding conditions, of which value should be fixed when collectively setting the read values of the molding conditions, is made selectable.

On the other hand, if the molding condition items of which values should be fixed is made selectable, there arises a problem in collectively setting molding conditions read from the storage device, which have set values of such molding conditions items to be changed. The problem arises because there are some molding conditions correlated with other molding conditions. If items of such some molding conditions are selected to be the items of which values are fixed, the set values of the correlated molding conditions are contradicted with each other because the some correlated molding conditions are unchanged when the other molding conditions are changed. Thus, there arises a case where optimal values of the molding conditions are not set.

As an example of the above mentioned correlated molding conditions, there are an ejection start position (an position of a movable mold at which an ejecting of an product is started) and a mold opening completion position. The ejection start position should be set between a mold opening start position (mold closed position) and the mold opening completion position of the movable mold. If the item of the ejection start position is selected to be the item of which values should be fixed, there arises a contradictory case where the ejection start position is not set between the mold opening start position and the mold opening completion position when a predetermined set of molding conditions having a value of the mold opening completion position smaller than the fixed set value of the ejection start position are read from a storage device and collectively set to the set values of the molding conditions of the items (including the mold opening completion position) other than the items of which value should be fixed.

Further, in the case where both of a function #1 and a function #2 can not be enabled, if the function #1 is selected to be fixedly enabled, there arises a problem that the function #2 is also made enabled when a predetermined set of molding conditions having a value "enable" of the function #2 are read and collectively set to the set values of the molding conditions.

SUMMARY OF THE INVENTION

The present invention provides an injection molding machine capable of selecting and designating items of molding condition of which values should be maintained when reading a set of predetermined values of the molding conditions from a storage device and collectively setting the set values of the molding conditions using read predetermined values.

Further, the injection molding machine of the present invention is configured such that all of the set values of the molding conditions are maintained if the set values of the molding conditions of the items of which values should be fixed are different from the read predetermined values, since the items of the molding conditions of which values should be fixed are made selectable and there are correlated items in the molding conditions. Further, there are provided two selective modes which respectively enables and disables rewriting the set values of the molding conditions of items other than the items of which values should be fixed, to the read predetermined values if the set values of the molding conditions of the items of which values should be fixed are different from the predetermined values read from the storage device.

An injection molding machine of the present invention performs injection molding operations in accordance with set values of molding conditions. The injection molding machine comprises: a display device; a data input device for manually inputting data; and molding condition display/setting means for displaying items of the molding conditions on the display device and for setting values of items of the molding conditions displayed on the display device according to the manual input through the data input device. The molding condition display/setting means includes; installation-setting item designating means for designating any of the items of the molding conditions to installation setting that disables rewriting of the set value thereof and for canceling the designation of the installation setting according to manual input through the data input device; and rewrite control means for reading a set of predetermined values of the molding conditions from a storage device and collectively setting the set values of the molding conditions using the read set of predetermined values of the molding conditions, wherein the rewrite control means maintains the set values of the molding conditions of the items designated to the installation-settings by the installation-setting item designating means. Thus, when the set values of the molding conditions are set collectively, the set values for the items designated to the installation setting are fixed to the present values without being changed.

The rewrite control means may rewrite the set values of the molding conditions of the items other than the items designated to the installation setting, to the values of the molding conditions read from the storage device.

The rewrite control means may comprise determining means for determining whether or not the set values of the molding conditions of the items designated to the installation setting are identical with the values of the molding conditions read from the storage device, and the rewrite control means may maintain the set values of the molding conditions of the items other than the items designated to the installation settings if the set values of the molding conditions of the items designated to the installation setting are not identical with the predetermined values of the molding conditions read from the storage device.

The injection molding machine may further comprise means for selecting one of a first mode and a second mode which respectively enables and disables rewriting of the set values of the molding conditions of the items other than the items designated to the installation setting to the predetermined values of the molding conditions read from the storage device when the set values of the molding conditions of the items designated to the installation setting are not identical with the read values of the molding conditions. The rewrite control means may comprise determining means for determining whether or not the set values of the molding conditions of the items designated to the installation setting are identical with the predetermined values of the molding conditions read from the storage device, and may rewrite the set values of the molding conditions of the items other than the items designated to the installation setting when the first mode is selected, and rewrites the set values of the molding conditions of the items other than the items designated to the installation setting only if all of the set values of the molding conditions of the items designated to the installation setting are identical with the predetermined values of the molding conditions read from the storage device when the second mode is selected.

The molding-condition display/setting means may further comprise password discriminating means for determining whether or not an authentication password inputted through the data input device is identical with a registered password and permitting the designation and cancellation of the installation setting by the installation-setting item designating means when it is determined that the inputted password is identical with the registered password by the password discriminating means.

The molding condition display/setting means may further comprise set-value modification enabling means for determining whether or not a set-value modification password to permit change of the set value for the item designated to the installation setting is inputted and for enabling modification of the set value of the item designated to the installation setting when it is determined that the set-value modification password is inputted.

The molding-condition display/setting means may enable input/output of information on the designation of the installation setting to the respective items of the molding conditions.

The molding condition display/setting means may be provided within a controller of the injection molding machine.

The molding condition display/setting means may be provided separately from a controller of the injection molding machine and connected thereto.

When the set values of all the molding conditions are set collectively using the predetermined values of the molding conditions read from the storage device, the set values of the molding conditions of the items selected and designated to the installation setting are fixed to the present values without being rewritten. Thus, the set values of the molding conditions of the items which should not be changed can be prevented from being unexpectedly changed.

Further, the set values of the molding conditions of the items other than the items designated to the installation settings are maintained if the set values of the molding conditions of the items designated to the installation setting are not identical with the predetermined values of the molding conditions read from the storage device, to thus prevent inconformity between the correlated molding conditions.

BRIEF DESCRIPTION OF THE DRAWINGS

FIG. 4 is a diagram illustrating an installation setting storage table according to the first embodiment;

FIG. 5 shows an algorithm for an operational flow illustrating processing for designating and canceling installation setting for set items of molding conditions according to the first embodiment;

DETAILED DESCRIPTION

Figure 1:
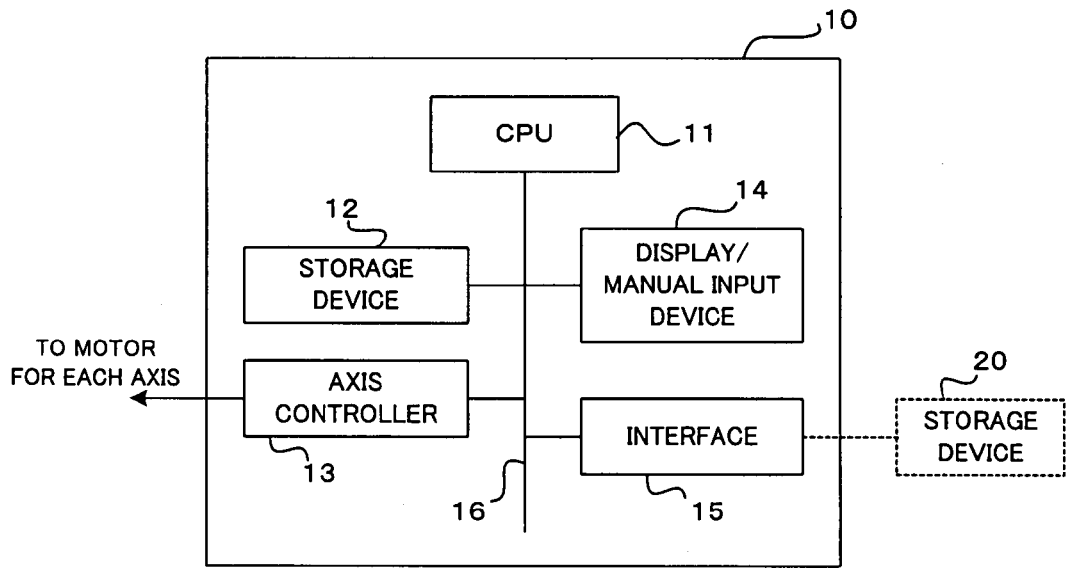
FIG. 1 is a schematic block diagram of a controller for controlling an injection molding machine according to a first embodiment of the invention.

FIG. 1 is a schematic block diagram of a controller for controlling an injection molding machine according to a first embodiment of the invention. The respective configurations of the injection molding machine and hardware of the controller for controlling the injection molding machine are the same as those of a conventional injection molding machine. A difference lies only in processing softwares for adjusting set items (mentioned later) to installation setting and processing for setting molding conditions to be stored in storage device. Therefore, the following is a brief description of only principal parts of the configuration of the controller for controlling the injection molding machine shown in FIG. 1.

A controller 10 for controlling the injection molding machine, like a conventional controller, includes a processor (CPU) 11, storage device 12, axis controller 13, display/manual input device 14, and an interface 15, which are connected to one another by a bus 16.

The storage device 12 is stored with softwares and various set values for controlling the injection molding machine. According to the present invention, the storage device 12 is stored with the processing softwares for adjusting the set items to the installation setting and setting the molding conditions to be stored in the storage device. The storage device 12 includes a storage area that stores set values of the molding conditions to be executed. Further, the storage device 12 is also loaded with data such as a molding condition setting frame to be displayed on a display screen of the display/manual input means. Corresponding to a mold, furthermore, a mold file is stored as a set of predetermined values of the molding conditions for the mold concerned. If there are a plurality of sets of predetermined values for molding conditions for the mold, the mold file is stored discriminatingly in consideration of it. Alternatively, the mold file may be previously stored in an external storage device 20 without being stored in the storage device 12. In this case, a set of molding conditions is read from the mold file through the interface 15 and set in a storage section for the molding conditions to be executed.

The axis controller 13 serves to control the position and speed of a servomotor for each mechanism, such as a mold clamping mechanism, injection mechanism, or metering mechanism. It performs position and speed control based on feedback signals from position/speed detectors that are attached to the servomotors, thereby drivingly controlling the mechanism.

The display/manual input device 14 is composed of a display device, such as a CRT or liquid crystal, and data input means, such as a keyboard or pointing device. Various set values (mentioned later) can be inputted by means of the display/manual input device 14. In the present embodiment, display/setting device is constituted by the display/manual input device 14 of the controller 10 of the injection molding machine and the processing softwares for adjusting the set items to the installation setting and setting the molding conditions to be stored in the storage device 12.

The interface 15 is connected to a sensor and an actuator that are attached to the injection molding machine. According to the present invention, the interface 15 is connected to the external storage device 20.

Only specific operators who enter an authentication password that permits the installation setting are allowed to designate items of the molding conditions to the installation setting which fixes values of the items of the molding conditions to be unchangeable, or to cancel the designation of the installation setting for making the set values thereof changeable.

Figure 2A:
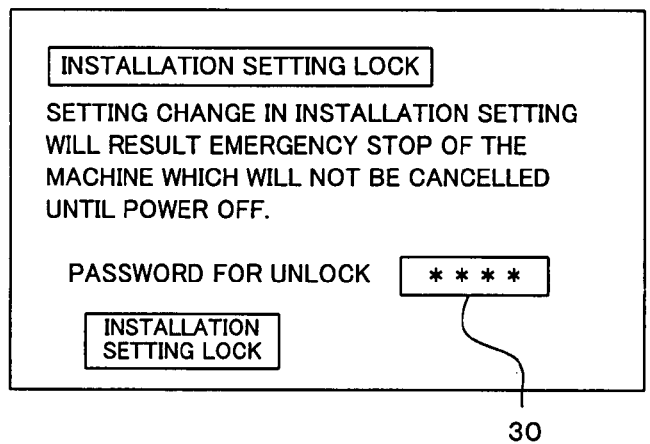
FIG. 2a is a diagram illustrating an installation-setting lock frame according to the first embodiment before entry of a password.
Figure 2B:
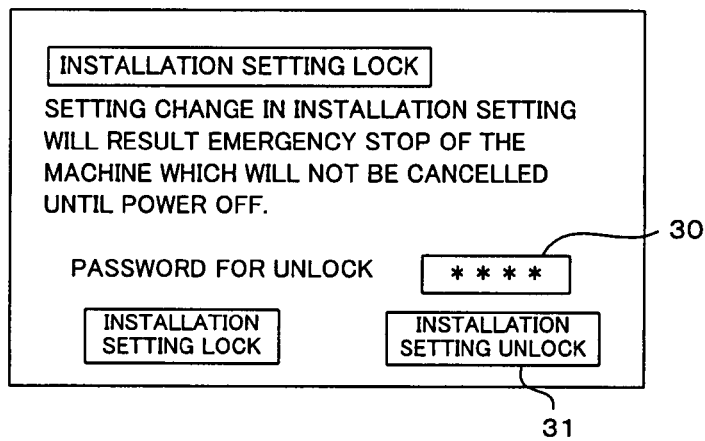
FIG. 2b is a diagram illustrating the installation-setting lock frame after entry of the password.

In designating or canceling the installation setting of the set items, the input means of the display/manual input device 14 is operated to display an installation-setting lock frame, such as the one shown in FIG. 2a, on the screen of the display device. If a password is entered in a password column 30 displayed in the frame, the processor 11 determines whether or not the entered password agrees with a previously registered authentication password. If the password agrees, an installation-setting unlock button 31 is displayed, as shown in FIG. 2b.

Figure 2C:
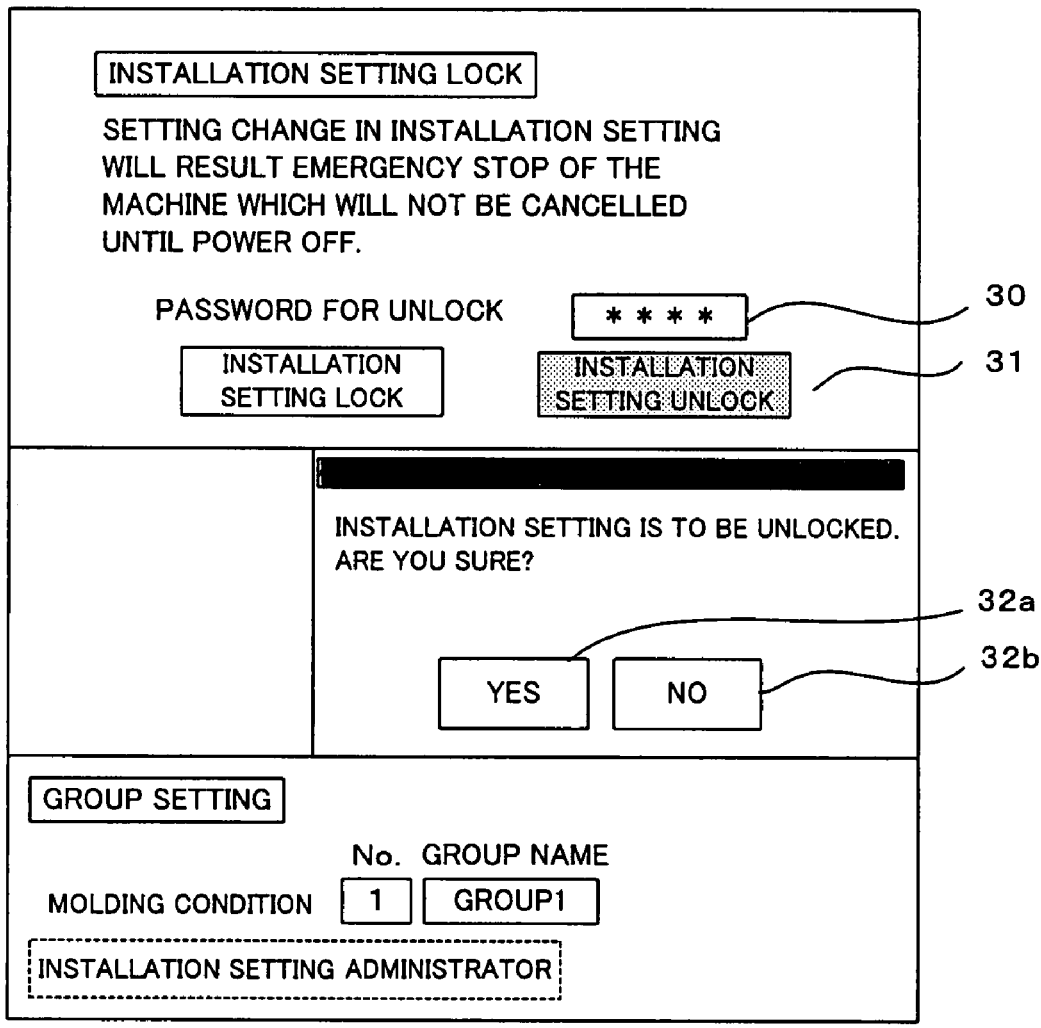
FIG. 2c is a diagram illustrating the installation-setting lock frame before depression of an installation-setting unlock button.
Figure 2D:
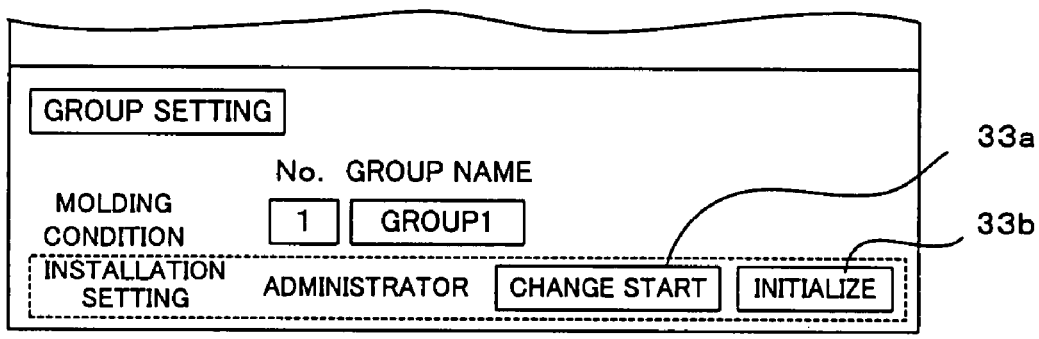
FIG. 2d is a diagram illustrating a part of the installation-setting lock frame after depression of the installation-setting unlock button.

The display screen is changed, as shown in FIG. 2c, by depressing the installation-setting unlock button 31 (i.e., by clicking the button 31 with the pointing device or by selecting the button 31 with a cursor and operating an enter key). In the description to follow, depressing the button will be supposed to imply operating the button with the pointing device or the cursor for inputting. Thereupon, a YES button 32a and a NO button 32b are displayed to ask if the installation setting should be unlocked. If the YES button 32a is depressed, a change start button 33a and an initialization button 33b are displayed on the display screen, as shown in FIG. 2d. FIG. 2d shows only a column "group setting" at the lower part of FIG.

2c. The upper part of the display screen shown in FIG. 2c is omitted for simplicity from the illustration in FIG. 2d.

If the change start button 33a is depressed, the display of this button is changed into "changeable". Thereafter, the installation setting can be designated or canceled for the set items of the molding conditions in the molding condition setting frame.

Figure 3:
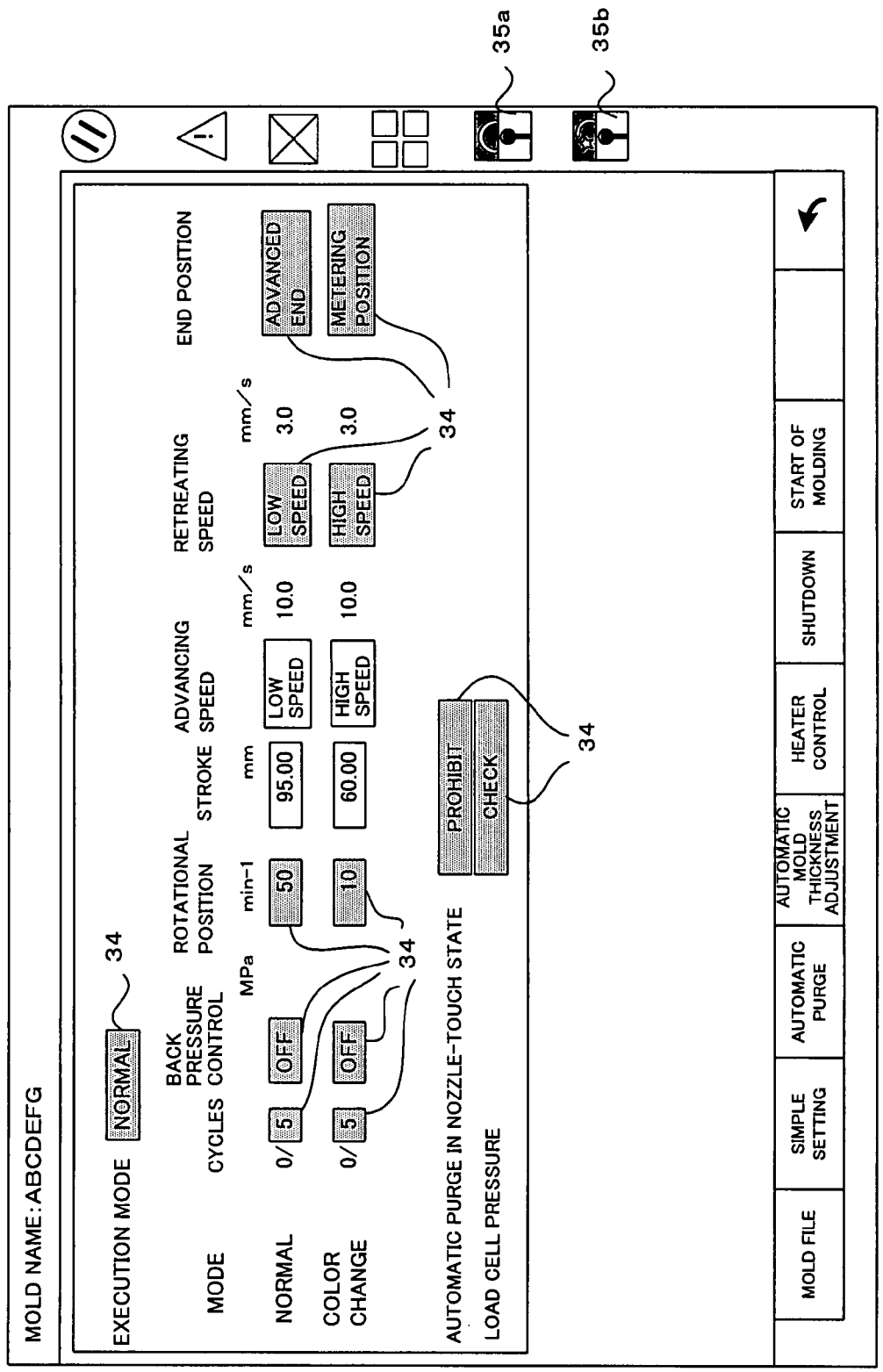
FIG. 3 is a diagram illustrating an example of a molding condition setting frame according to the first embodiment.

FIG. 3 shows an example of the molding condition setting frame. Set value columns for the set items designated to the installation setting, among other set items of the molding conditions, are displayed against gray backgrounds. In FIG. 3, each set value for each set item denoted by numeral 34 is displayed against a gray background, whereby it is indicated that the item concerned is designated to the installation setting. Set columns for normal set items that are not designated to the installation setting are displayed against white backgrounds.

In this arrangement, the set items are selected by means of the cursor or the pointing device, and an installation setting protect button 35a or an installation setting cancel button 35b is depressed. Thereupon, the selected items are designated to the installation setting, or the items designated to the installation setting are changed into normal setting items. Thus, if the installation setting protect button 35a is depressed, the selected set items are subjected to the installation setting, so that their set values are rendered unchangeable. If the installation setting cancel button 35b is depressed after selecting the items designated to the installation setting, on the other hand, the installation setting of the set items is canceled to restore the normal set items, whereupon their set values become changeable.

If the installation setting is designated for the set items of the molding conditions in this manner, an installation setting storage table T shown in FIG. 4 is prepared such that the storage device 12 is stored with information to determine for each ID number for each molding condition whether or not the set item of the molding condition is designated to the installation setting.

After the installation setting is selectively designated for the set item for each molding condition, the set value for the set item designated to the installation setting becomes unchangeable. If the mold of the injection molding machine is changed and if the set of molding conditions for the mold stored in the storage device 12 is read and collectively set as executive molding conditions, the processor 11 searches for the installation setting storage table T and fixedly holds the already set values for the set items designated to the installation setting without changing them into the read values. Thus, the set values for only those set items which are not designated to the installation setting are changed into the read values and set. The conditions set in this manner are used when the injection molding machine is operated.

FIG. 5 shows an algorithm for an operational flow illustrating processing for designating and canceling the installation setting for the set items of the molding conditions.

If the operator selects and displays the installation-setting lock frame shown in FIG. 2a on the display device and enters the password, the processor 11 determines whether or not the entered password agrees with the registered authentication password. If the entered password agrees with the authentication password, the display screen shown in FIG. 2b is displayed. When the installation-setting unlock button 31 is operated, the display screen is switched to the mode shown in FIG. 2c. If the YES button 32a is depressed to issue an installation-setting unlocking command, the display screen is switched to the mode shown in FIG. 2d (Step 100). Then, if the change start button 33a is depressed, the processor 11 switches the operation to an installation-setting designation mode (Step 101).

If the operator selects the molding condition setting frame, the processor 11 displays the selected frame. In doing this, the processor 11 searches for the installation setting storage table T and determines whether or not the set items to be displayed are designated to the installation setting. If the installation setting is designated, the set items of the currently executed molding conditions are displayed against the gray backgrounds of the set value columns for the set items. Further, the current set values are displayed against the white backgrounds of the set columns for the set items that are not designated to the installation setting (Step 102).

The operator selects a set item from the displayed molding condition setting frame and operates the installation setting protect button 35a or the installation setting cancel button 35b, thereby designating or canceling the installation setting for the selected set item. Depending on whether the installation setting is designated or canceled for the set item, the processor 11 updates the memory content of the installation setting storage table T. Designation of the installation setting is stored for the molding conditions for the set items designated to the installation setting, while cancellation of the installation setting is stored for the molding conditions for the set items not designated to the installation setting (Steps 103 and 104).

If another setting frame is selected after the registration of the installation setting for the setting frame concerned is finished (Step 105), the selected setting frame is displayed on the screen of the display device (Step 107), and the installation setting for the aforesaid set item is designated and canceled.

If the operator inputs an installation setting termination command, the procedure proceeds to Step 106 where the operator selects a mode of set-value rewriting processing for the molding conditions of the items other than the items designated to the installation setting. In this embodiment, when a set of predetermined values of molding conditions are read from a mold file to be set as the set values of the molding conditions to be used in the injection molding conditions, a way of setting the values of the molding condition items other than the items designated to the installation setting items is selectable from two modes of set-value rewriting processing. A set-value rewriting processing mode A is for rewriting the set value of the molding conditions of the items other than the items designated to the installation items to the predetermined values read from the mold file. In a set-value rewriting processing mode B, if any one of the predetermined values of the molding conditions read from the mold file is different from the set value of the molding conditions for use in the injection molding machine with respect to the items designated to the installation setting, all of the set values of the molding conditions are maintained without being rewritten, and only if all of the predetermined values read from the mold file are equal to the set values of the molding conditions with respect to the items designated to the installation setting, all of the set values of the molding conditions are rewritten to the predetermined values of the molding conditions read from the mold file.

In the case where the molding conditions of the items designated to the installation setting and the molding conditions of the items not designated to the installation setting are not correlated, i.e. the molding conditions of the items designated to the installation setting do not influence or are not influenced by the molding conditions of the items not designated to the installation setting, the set-value rewriting processing mode A is selected. Further, in the case where the molding conditions of the items designated to the installation setting and of the items not designated to the installation setting are correlated, and the correlated set values are to be modified manually after collectively setting the set values of the molding conditions of the item not designated to the installation setting, the set-value rewriting processing mode A may be selected.

The set-value rewriting processing mode B is selected in the case where the set values of the molding conditions of the items not designated to the installation setting should not be changed to maintain the correlation of the molding conditions when one of the correlated molding condition items is designated to the installation setting and the other of the correlated molding condition items is designated to the installation setting, and the set value of the other of the correlated molding condition items is to be changed by corrective setting of the set values of the molding conditions using the read predetermined molding conditions. Thus, one of the set-value rewriting processing modes A and B is selectable according to discretion of the operator in this embodiment.

The operator selects the set-value rewriting processing mode A to allow rewriting of the set values of the molding conditions of the item other than the items designated to the installation setting, if it is judged that the molding conditions of the items designated to the installation setting and the molding conditions of the items not designated to the installation setting in the processing of Step 103 are not correlated or if correlated set values are to be modified manually after being rewritten collectively. On the other hand, the operator selects the set-value rewriting processing mode B to prevent inconsistency of the set values of the correlated molding conditions, if it is judged that there is correlated molding conditions in the items designated to the installation setting and the items not designated to the installation setting so that they are influenced with each other.

Thus, indications of the set-value rewriting processing modes A and B are displayed on the display device at Step 106 to prompt the operator to select one of the set-value rewriting processing modes. When the operator selects one of the set-value rewriting processing modes A and B, the installation setting mode is turned off (Step 107) to terminate the installation setting processing.

Figure 6:
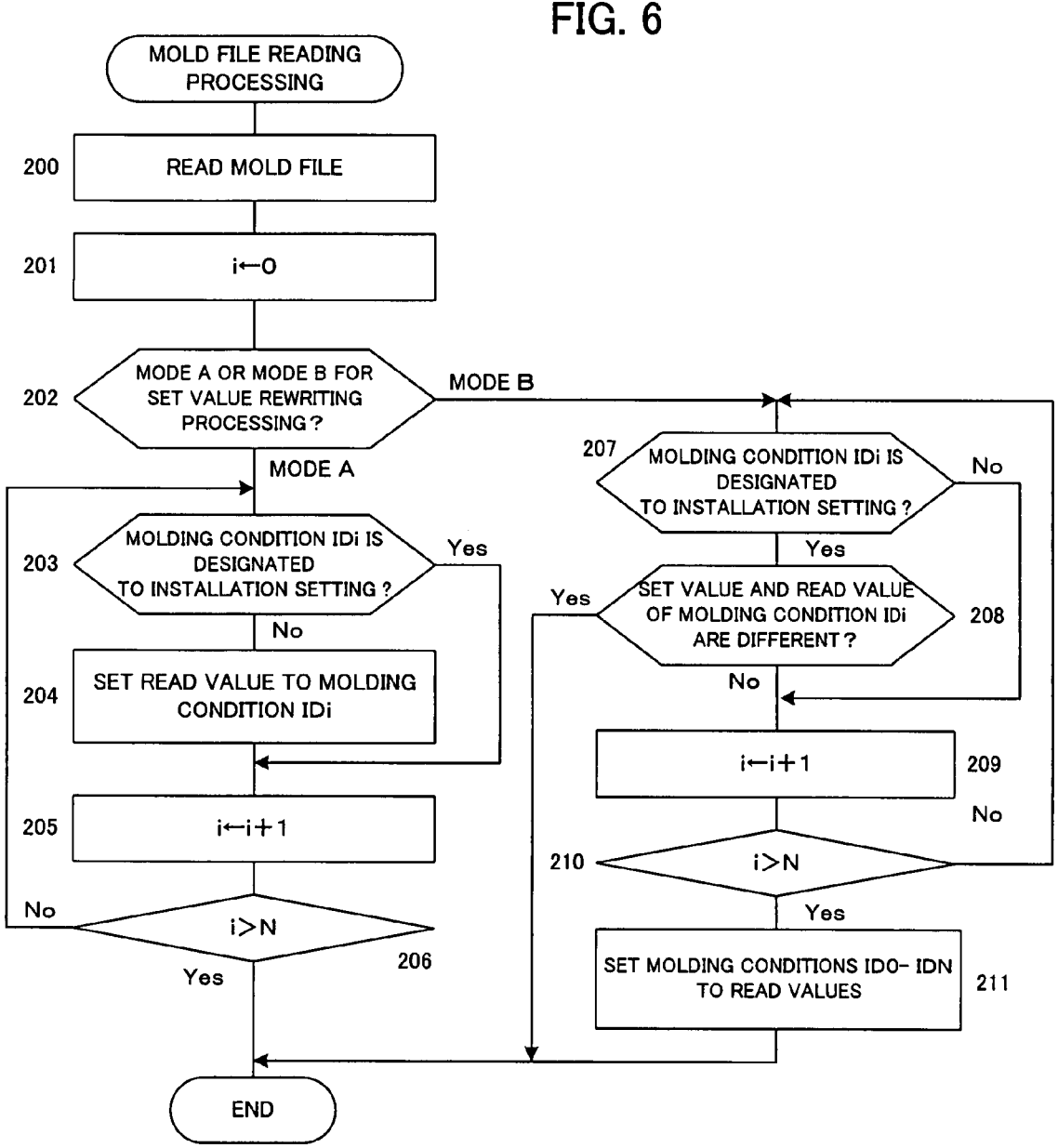
FIG. 6 is a flowchart showing an algorithm of processing for reading a set of molding conditions from a mold file and storing the read conditions as executive molding conditions according to the first embodiment.

FIG. 6 is a flowchart showing an algorithm of processing for reading a set of set values of the molding conditions from the mold file stored in the storage device 12 or the external storage device 20 and storing and setting set values of executive molding conditions for use in the injection molding operation.

When a mold file read command is inputted, the processor 11 starts the processing of FIG. 6 and first reads a set of predetermined values of the molding conditions stored in a mold file designated for a mold for use (Step 200). Then, an index i is set to 0 (Step 201), and it is determined which of the set-value rewriting processing modes A and B is selected (Step 202).

When it is determined that the set-value rewriting processing mode A is selected, it is determined whether or not an item of a molding condition of an ID number IDi is designated to the installation setting referring to the installation setting storage table T (Step 203). If the item is not designated to the installation setting, the read predetermined value of the molding condition is stored as the set value of the executive molding condition of the item (Step 204). If the item of the molding condition of the ID number IDi is designated to the installation setting, on the other hand, the set value of the executive molding condition of the item is not written so that the present set value is maintained and fixed without executing the processing of Step 204.

Then, the index i is incremented by 1 (Step 205), and it is determined whether or not the index i exceeds the number N of molding condition items (Step 206). The processing of Step 203 to 206 is repeatedly executed until the index i exceeds the number N of molding condition items, so that the set values of the molding conditions of the items not designated to the installation setting are rewritten to the predetermined values of the molding conditions of the items which are read from the mold file, and the set values of the molding conditions of the items designated to the installation setting are maintained and fixed as the present set values without being rewritten to be used for the executive molding conditions.

On the other hand, it is determined in Step 202 that the set-value rewriting processing mode B is selected, the procedure proceeds to Step 207 where it is determined whether or not the item of the molding condition of the ID number IDi is designated to the installation setting. If not, the procedure proceeds to Step 209. If the molding condition item is designated to the installation setting, it is determined whether or not the present set value and the read predetermined value of the molding condition of the ID number IDi are identical (Step 208). If the set value and the read value of the molding condition are not identical, the mold file reading processing is terminated. If the set value and the read value of the molding condition are identical, the procedure proceeds to Step 209 where the index i is incremented by 1 and it is determined whether or not the index i exceeds the number N of molding condition items (Step 210). If not, the procedure returns to Step 207 to execute the processing of Step 207 and the subsequent Steps. Then, unless the set value of the molding condition for the injection molding machine is different from the predetermined value of the molding condition read from the mold file, the processing of Steps 207-210 is repeatedly executed and when it is determined that the index i exceeds the number N of molding condition items (Step 210), all of the set values of the molding conditions IDi (i:0-N) are rewritten and undated to be the predetermined values of the molding conditions read from the mold file (Step 211), so that the mold file reading processing is completed.

As described, in the set-value rewriting processing mode A, irrespective of whether the present set values and the read predetermined values of the molding conditions are identical or not, the set values of the molding conditions of the items other than the items designated to the installation setting are rewritten to the predetermined values of the molding conditions read from the mold file. In the set-value rewriting processing mode B, only if all of the set values of the molding conditions of the items designated to the installation setting are identical to the predetermined values of the molding conditions read from the mold file, all of the set values of the molding conditions are rewritten to the read predetermined values of the molding conditions. If any one of the set values of the molding conditions of the items designated to the installation setting is not identical to the predetermined values of the molding conditions read from the mold file, the set values of the molding conditions are not rewritten to be unchanged, to thus eliminate an error or inconsistency of the set values of the correlated molding conditions.

If a password that permits designation and cancellation of the installation setting for the set items of the molding conditions, the installation setting for the set items can be both designated and canceled, as mentioned before. Therefore, the set values for the items designated to the installation setting can be changed by only canceling the installation setting for the set items, changing the set values, and then designating the installation setting. In changing the set values for the set items designated to the installation setting, as mentioned before, it is inconvenient to cancel the installation setting to change the set values and set the values again for the installation setting. The operator who can input the password that permits designation and cancellation of the installation setting can practically change the set values for the set items designated to the installation setting. When this password is entered, therefore, the set values for the set items designated to the installation setting may be changed directly.

On a working site or the like, moreover, the set values for the set items designated to the installation setting sometimes may be expected to be changed, although the installation setting can be neither designated nor canceled. To attain this, a password that permits change of the set values for the set items designated to the installation setting is provided so that only those operators who enter the password can change the set values for the set items designated to the installation setting.

In this case, FIG. 2b is displayed if the password that permits change of the set values for the set items designated to the installation setting is entered on the screen shown in FIG. 2a. If the installation-setting unlock button 31 is depressed, moreover, the screen shown in FIG. 2c is displayed. If the change start button 33a is depressed, the installation setting is unlocked, whereupon the set values for the set items designated to the installation setting can be changed on each molding condition setting frame. Although the installation setting can be neither designated nor canceled for the set items, in this case, only the set values can be changed. This processing is substantially the same as the algorithm of the processing shown in FIG. 5. A difference lies only in that the processing of Step 108 is replaced by processing for changing the set values.

If the molding conditions are saved in the mold file or the like after set values for the set items of the molding conditions are set and changed so that the molding conditions to be used for actual molding are settled, the set items are loaded into the mold file without regard to whether or not they are designated to the installation setting.

Further, information in the installation setting storage table T, that is, information as to whether or not the set items are designated to the installation setting, is outputted as a file to the outside and loaded into controllers of other injection molding machines so that the table T can be also utilized for the other injection molding machines. Thus, if the molding conditions for only one injection molding machine are adjusted to designate or cancel the installation setting, they can also serve for any other injection molding machines.

In the embodiment described above, the display/setting device is constituted by the display/manual input means 14 of the controller 10 for controlling the injection molding machine and the softwares stored in the storage device 12. The display/setting device is used to perform the processing for designating and canceling the installation setting for the set items of the molding conditions and the processing for changing the set values for the set items designated to the installation setting. However, this display/setting device may be replaced with a display/setting device composed of a personal computer that is provided outside the injection molding machine. In this case, the display/setting device is used to execute the processing for designating and canceling the installation setting and the processing for changing the set values for the set items designated to the installation setting and to feed finally obtained information on the molding conditions (concerning the installation setting, set values, etc.) to the controller of the injection molding machine.

Figure 7:
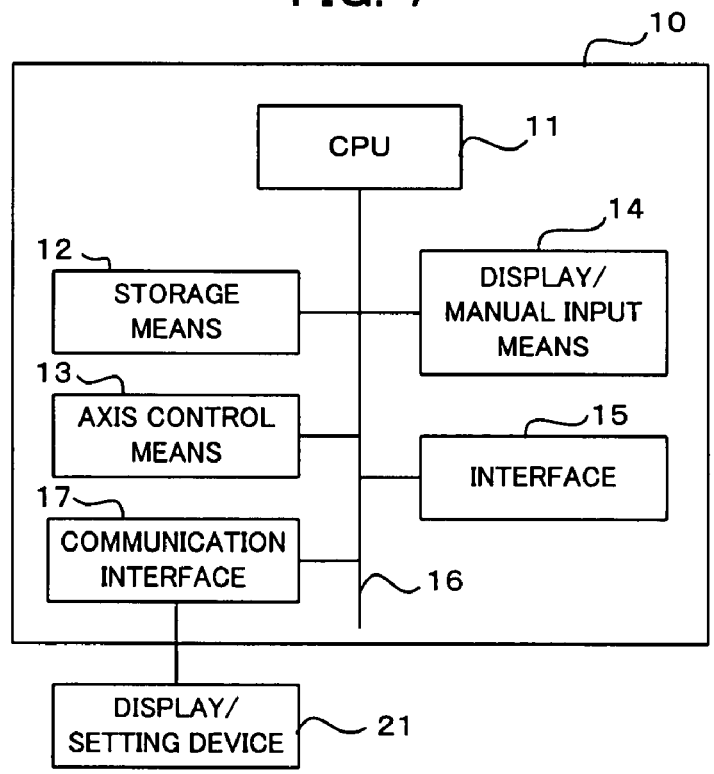
FIG. 7 is a schematic diagram showing a second embodiment of the invention.

FIG. 7 is a schematic diagram showing a second embodiment of the present invention. In this second embodiment, a display/setting device 21 composed of a personal computer is provided outside an injection molding machine and connected to a controller 10 of the machine through a communication interface 17. The display/setting device 21 is used to execute processing for designating and canceling installation setting, processing for changing set values for set items designated to the installation setting, and processing for setting set values for normal set items.

A memory of the display/setting device 21 is provided with an installation setting storage table T as well as a storage section for storing data on a molding condition setting frame and set values for various set items of molding conditions. Further, a mold file may be previously loaded into the memory of the display/setting device 21 or stored into an external storage device (not shown) so that the display/setting device 21 can read molding condition information on the mold file from the storage device.

An input device, such as a keyboard, of the display/setting device 21 is operated to enter a password that permits designation and cancellation of the installation setting or a password that permits change of the set values for the set items designated to the installation setting. Then, the installation-setting unlock button 31, YES button 32a, and change start button 33a (see FIG. 2) are operated, whereupon a processor of the display/setting device 21 designates the installation setting mode. As mentioned before, the processor performs designation or cancellation of the installation setting for the set items and change of the set values for the set items designated to the installation setting, thereby creating and updating the installation setting storage table T. In reading the predetermined values of a set of molding conditions from the mold file, as mentioned before, the set values for the set items designated to the installation setting are not changed, and the set values for the other set items are changed into the read predetermined values for the set items in the mold file. If the set values obtained in this manner are subjected to designation or cancellation of the installation setting for the set items, change of the set values for the set items designated to the installation setting, and change of the set values for the normal set items, the set items of the molding conditions and their set values finally settled by the change processing and data in the installation setting storage table T are fed to the controller 10 of the injection molding machine and loaded into storage device of the controller 10. Based on the molding condition information fed in this manner, the controller of the injection molding machine makes display on a molding condition setting frame. Further, the controller drivingly controls the injection molding machine in accordance with the set values of the molding conditions.

Figure 8:
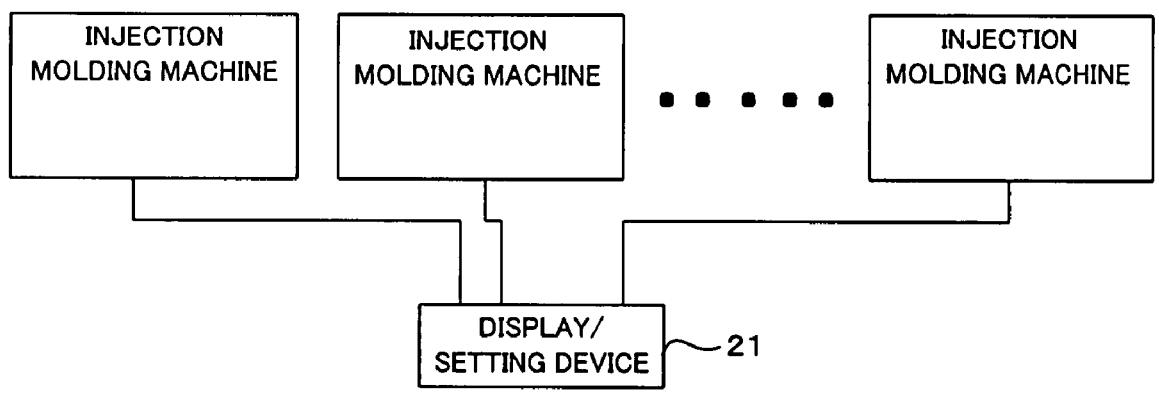
FIG. 8 is a schematic diagram showing a third embodiment of the invention.

FIG. 8 is a schematic diagram showing a third embodiment of the present invention. A plurality of injection molding machines are connected to a display/setting device 21, which is composed of a personal computer. As mentioned before, the display/setting device 21 is used to execute processing for setting set values for set items of molding conditions, processing for designating and canceling installation setting for the set items, processing for changing the set values for the set items designated to the installation setting, and processing for reading the predetermined values of the molding conditions from a mold file. Then, the set values for the set items of the molding conditions are settled, an injection molding machine is designated, and the molding condition information is fed to the designated injection molding machine, whereupon the molding conditions are set for the machine. In this third embodiment, the single display/setting device 21 can set the molding conditions for a plurality of injection molding machines.

What is claimed is:

1. An injection molding machine for performing injection molding operations in accordance with set values of molding conditions, comprising:

a display device;

a data input device for manually inputting data; and molding condition display/setting means for displaying items of the molding conditions on said display device and for setting values of items of the molding conditions displayed on said display device according to the manual input through said data input device, said molding condition display/setting means including;

installation-setting item designating means for designating any of the items of the molding conditions to installation setting that disables rewriting of the set value thereof and for canceling the designation of the installation setting according to manual input through said data input device; and rewrite control means for reading a set of predetermined values of the molding conditions from a storage device and collectively setting the set values of the molding conditions using the read set of predetermined values of the molding conditions, wherein said rewrite control means maintains the set values of the molding conditions of the items designated to the installation-settings by said installation-setting item designating means.

2. An injection molding machine according to claim 1, wherein said rewrite control means rewrites the set values of the molding conditions of the items other than the items designated to the installation setting, to the values of the molding conditions read from the storage device.

3. An injection molding machine according to claim 1, wherein said rewrite control means comprises determining means for determining whether or not the set values of the molding conditions of the items designated to the installation setting are identical with the values of the molding conditions read from the storage device, and said rewrite control means maintains the set values of the molding conditions of the items other than the items designated to the installation settings if the set values of the molding conditions of the items designated to the installation setting are not identical with the predetermined values of the molding conditions read from the storage device.

4. An injection molding machine according to claim 1, further comprising means for selecting one of a first mode and a second mode which respectively enables and disables rewriting of the set values of the molding conditions of the items other than the items designated to the installation setting to the predetermined values of the molding conditions read from the storage device when the set values of the molding conditions of the items designated to the installation setting are not identical with the read values of the molding conditions, wherein said rewrite control means comprises determining means for determining whether or not the set values of the molding conditions of the items designated to the installation setting are identical with the predetermined values of the molding conditions read from the storage device, and said rewrite control means rewrites the set values of the molding conditions of the items other than the items designated to the installation setting when the first mode is selected, and rewrites the set values of the molding conditions of the items other than the items designated to the installation setting only if all of the set values of the molding conditions of the items designated to the installation setting are identical with the predetermined values of the molding conditions read from the storage device when the second mode is selected.

5. An injection molding machine according to claim 1, wherein said molding-condition display/setting means further comprises password discriminating means for determining whether or not an authentication password inputted through said data input device is identical with a registered password and permitting the designation and cancellation of the installation setting by said installation-setting item designating means when it is determined that the inputted password is identical with the registered password by the password discriminating means.

6. An injection molding machine according to claim 1, wherein said molding condition display/setting means further comprises set-value modification enabling means for determining whether or not a set-value modification password to permit change of the set value for the item designated to the installation setting is inputted and for enabling modification of the set value of the item designated to the installation setting when it is determined that the set-value modification password is inputted.

7. An injection molding machine according to claim 1, wherein said molding-condition display/setting means enables input/output of information on the designation of the installation setting to the respective items of the molding conditions.

8. An injection molding machine according to claim 1, wherein said molding condition display/setting means is provided within a controller of the injection molding machine.

9. An injection molding machine according to claim 1, wherein said molding condition display/setting means is provided separately from a controller of the injection molding machine and connected thereto.

* * * * *